United States Patent [19]

Rehse

[11] Patent Number: 5,270,627
[45] Date of Patent: Dec. 14, 1993

[54] MACHINE TOOL CONTROL SYSTEM

[75] Inventor: Denis Rehse, St. Petersburg, Fla.

[73] Assignee: Unilens Corp., U.S.A., Largo, Fla.

[21] Appl. No.: 719,472

[22] Filed: Jun. 24, 1991

[51] Int. Cl.⁵ .............................................. G05B 19/33
[52] U.S. Cl. .................... 318/575; 318/560;
318/568.19; 318/569; 318/574; 364/474.36;
364/474.01
[58] Field of Search ................ 318/560, 568.19, 569,
318/574, 575; 364/474.36, 474.01

[56]  References Cited
U.S. PATENT DOCUMENTS

| 4,199,814 | 4/1980 | Rapp et al. | 318/568 |
| 4,344,127 | 8/1982 | McDaniel et al. | 318/569 |
| 4,931,709 | 6/1990 | Ikeda et al. | 318/567 |
| 4,956,785 | 9/1990 | Kawamura et al. | 304/474.01 |

Primary Examiner—William M. Shoop, Jr.
Assistant Examiner—Karen Masih
Attorney, Agent, or Firm—Yahwak & Associates

[57] ABSTRACT

A machine tool control system in which a programmable controller operates a machine to carry out a plurality of programmable functions. The controller includes a plurality of processor means, a first one of the processor means capable of pre-processing and forwarding control information to a second of said processor means, wherein said second processor means provides control information to control machine movement. Advantageously, the second processor means operates on a periodic time based interrupt method which greatly increases the accuracy of the machine.

5 Claims, 3 Drawing Sheets

MACHINE TOOL CONTROL SYSTEM

FIELD OF THE INVENTION

This invention relates to a machine tool control system and, more particularly, to a closed loop DC servo machine tool control system which advantageously utilizes multiple computers and pre-processed data.

BACKGROUND OF THE INVENTION

Numerous types of machine tool control systems exist in the prior art. Generally, in such systems, the motions of the machine tool parts are controlled in accordance with predetermined programs corresponding to the various movable machine tool parts. The actual position or orientation of a movable machine tool component with respect to a particular axis, is determined by a position setting device associated with that axis. In a closed loop control system, the desired position or orientation of a machine tool component, and the actual position or orientation thereof with respect to a particular axis, are fed to at least one position controller which generates a control signal encoding the value of a desired rate of translation or rotation, this control signal being transmitted to the drive associated with the respective axis.

Such systems may be configured as point to point, or master-slave axis arrangement, or time base axis arrangement. In the point to point control system, possibly the most common machine control implementation, each axis is given a destination and when all the axis have arrived at their destination, a new set of destinations are then issued. The master-slave and the time base arrangement, have the advantage over the point to point control of not being required to wait for discrete synchronization points before updating. In the master-slave system, the slave axis tracks the master axis which travels at a predetermined velocity. Therefore, if the master axis runs too fast, then the slave axis will lag behind, as a result the slave axis velocity must be increased to compensate for the lag. In general, with such a system, any perturbation in the master axis will be reflected in the slave axis, because the slave axis is tracking the master axis.

In all the control arrangements, a tradeoff is made between speed and accuracy. The greater the distance traversed without a correction, the greater will be the error. This error can be reduced by reducing speed, thereby reducing the distance traversed between corrections. For example, if a design required an error correction every quarter micrometer, and the system update time was ten milliseconds, then the maximum feed rate would be 0.025 millimeters per second, or approximately seventeen minutes per inch.

It is, therefore, an aspect of the instant invention to provide a machine control system which provides greater precision and accuracy at higher speeds than prior art machine control systems.

In many prior art machine control systems, the processor for these controllers is designed to rapidly execute programmable controller type instructions, which in medium to large sized controllers include not only instructions that manipulate single-bit input and output data, but also arithmetic instructions, file handling instructions, timers and counters, sequencer and other more complex instructions. To insure that the programmable controller can respond quickly to change in the status of sensing devices on the controlled system, it is imperative that the controller execute the control program repeatedly at a very high rate. The rate at which a programmable controller can execute the instructions, the type of instructions, as well as the size of the control program, are the primary factors which determine the rate at which the programmable controller can repeatedly execute, or "scan", the control program.

A problem arises, however, with machine control systems that require a high degree of accuracy and precision, while maintaining a moderate cutting speed. That is, the processor driving the controller must be able to respond very rapidly in order to achieve great precision at speed, an objective that many prior art controllers are unable to meet.

It is, therefore, another aspect of the instant invention to provide a machine control system which utilizes a processor configuration capable of rapidly handling large amounts of data to insure precision, accuracy, and speed.

SUMMARY OF THE INVENTION

In accordance with the invention, there is provided a programmable controller for operating a machine to carry out a plurality of programmable functions, the machine having a controllable X-axis function and a controllable Y-axis function or additional axes.

It is a feature of the invention that the programmable controller includes a plurality of processor means, a first one of said processor means capable of preprocessing incoming data and forwarding control information to a second one of said processors. The form chosen for this preprocessed data is critical to allow flexibility of control, judicious use of memory resources, and rapid execution by said second processor or other processors.

It is another feature of the invention that a second or more of said processor means provides control information to control machine movement. It is still another feature of the invention that said second or more of said processors provides a periodic time-based interrupt, and that X-axis function and Y-axis function, or additional axes function, is responsive to said time-based interrupt.

BRIEF DESCRIPTION OF THE DRAWINGS

The foregoing and additional objects, features and advantages of the present invention will become apparent from a more detailed consideration of preferred embodiments thereof, taken in conjunction with the accompanying drawings, in which.

DETAILED DESCRIPTION OF THE INVENTION

The physical layout of an exemplary machine that this control system has been applied, consists of two independent fluid bearing tables mounted on a common base that is floated on three air bags. The air suspension greatly reduces that amount of vibration being transmitted into the work piece from outside sources. The tables are designated X and Y and move perpendicular to each other. The diamond cutting tools are mounted on the X table, and the spindle which holds and rotates the work piece is mounted on the Y table. The X and Y tables are moved by lead screws driven by the X and Y axis motors designated 20 and 21 in FIG. 1. Also mounted on the base is a laser transducer which generates a laser beam. This beam is split by mirrors into two beams, designated X and Y laser beams. These beams are parallel to the X and Y tables upon which are mounted mirrors. These mirrors reflect the X and Y laser beams into the X and Y laser receivers designated 28 and 29 in FIG. 1.

Figure 1:
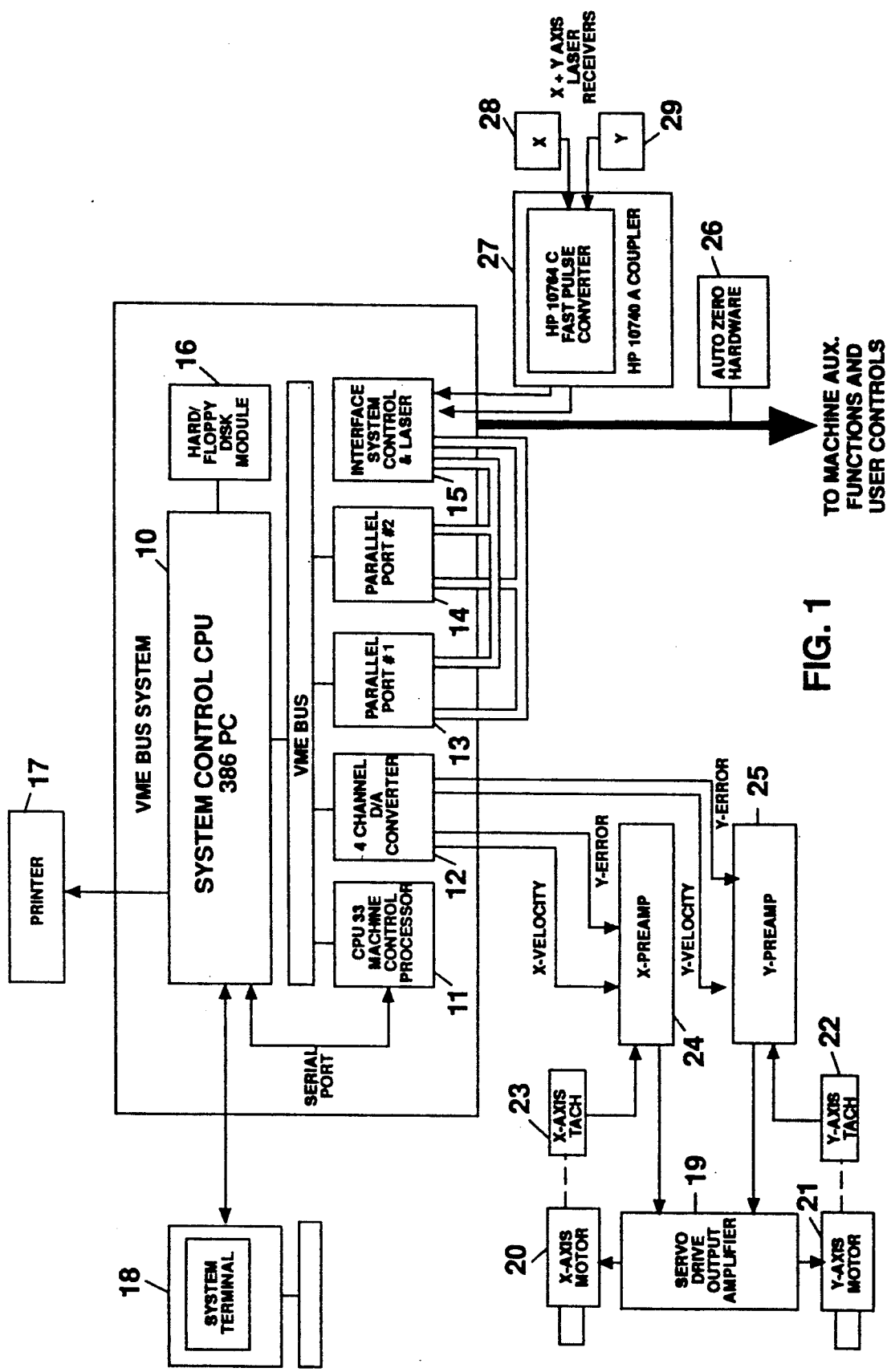
FIG. 1 is the block diagram of the control system.

Referring to FIG. 1, there is shown a block diagram of the elements of the machine control system of the instant invention. The machine control system configuration consists of two processor modules, a system control CPU and a machine control processor, a four channel digital to analog converter (DAC) module, two parallel port modules and a machine interface which interfaces the control system with the auxiliary machine functions and the equipment which determines the position of the X and Y-axis in the machine control system.

More particularly, the system control CPU 10 acts as the system supervisor, monitors all machine movements, and has priority to shut down the system in response to operator input, or in case of catastrophic failure of the machine or any other part of the system. This processor is also responsible for preprocessing data entered by users via a CAD system. After preprocessing by system, control CPU 10, data is then transmitted to the machine control processor 11 over the VME bus for the purpose of performing the actual machine movements.

Advantageously, system control CPU 10 is designed for multi-tasking, so that it may be pre-calculating machine movements while monitoring an operation in progress, and also remaining responsive to operator input. Processor 10 also handles all major control functions, such as starting, stopping, pausing, etc. Processor 10 issues proper commands to the control processor 11 to execute these tasks.

The second processor, as indicated above, is the machine control processor 11 which directly controls and coordinates all machine movements and auxiliary functions. Processor 11 is a very fast 68030 processor module along with a math co-processor, and a one megabyte dual port ram. Advantageously, this processor is selected for its speed and linear addressing capabilities. In particular, the system is designed such that data may be transmitted to the dual port ram on the machine control processor from the supervisory processor 10, over the VME bus, without disturbing the ability of processor 11 to perform its necessary tasks. Processor 11 is capable of monitoring and controlling a two axis machine with an update rate of 32 microseconds. Faster feed speeds can also be used with the system, without sacrificing accuracy. Time to complete a task is consistent with the inventive time base control scheme. Also, accuracy is improved with time base control as will be described below.

A four channel DAC (Digital to Analog Converter) 12 is provided to interface with the equipment which determines X-axis velocity, Y-axis velocity, X-axis error correction, and Y-axis error correction. More particularly, data from the machine control processor is transmitted via the VME bus to DAC module 12. This data is then transmitted to a Y preamp 25 and an X preamp 24, with data being transmitted including X velocity, X error, Y velocity and Y error. Data from the X preamp 24 and the Y preamp 25, is then applied to the servo drive output amplifier 19, which in turn drives the X-axis motor 20 and the Y-axis motor 21. Also included is an X-axis tach 23, which monitors the speed of the X-axis motor, and a Y-axis tach 22, which monitors the speed of the Y-axis motor.

Two 64 bit parallel port modules 13 and 14, are used to control real time machine functions and utility functions. Real time functions include processes which must occur while cutting a desired part, such as spindle control, coolant sprays, reading the position of the tables, etc. Utility functions are all other functions necessary for machine set up and control. Examples are zeroing an axis, setting the laser interlock, testing a switch, etc.

The system further includes a machine system control and a laser interface 15, which is used to interface with a Hewlett Packard or Zygo laser interferometer position measuring system. In particular, the HP fast pulse converter card 27 generates a series of fast pulses necessary to determine a table position relative to a zero set point. The fast pulse converter card 27 accepts information from X axis laser 28 and Y axis laser 29. Module 15 accepts the fast pulses from the HP converter card, and counts the up-down pulses to determine table position. The laser interface portion of module 15 also handles the critical timing necessary to read the table position without losing any pulses from the laser.

The system also includes a watch dog timer, which must detect the latching of the laser data within an adjustable time window to allow the machine to continue to operate. If the laser data is not latched within the timed window, then the machine is shut down by hardware means. The watch dog timer protects against software, as well as hardware failure. Watchdog timer circuits are known in the art and described, for example, in U.S. Pat. No. 4,263,647, issued on Apr. 21, 1981.

The system also includes a hard floppy disk module 16, a system terminal 18 for operator control, along with printer 17 for providing hard copy of machine data, and auto zero hardware 26 for initializing machine control functions.

This control system could have been applied to any number of other machines or robotic mechanisms consisting of a number of control axes utilizing various feedback mechanism such as optical scales, rotary encoders, etc. The control system could also have been implemented utilizing other computer or microprocessor platforms and other computer bus communications schemes.

Figure 2:
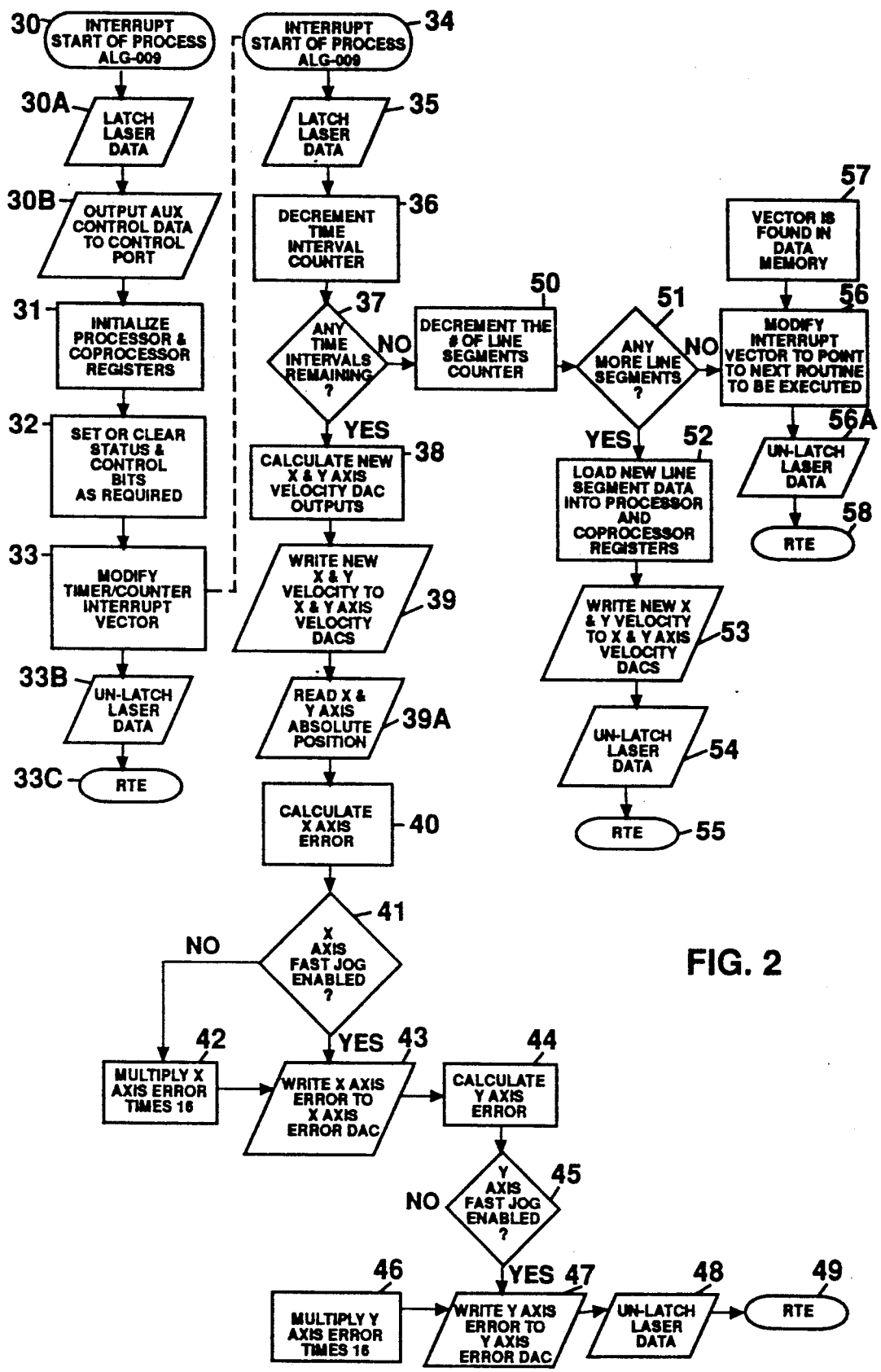
FIG. 2 is a flow chart of the algorithm that controls coordinated machine movements.

Referring to FIG. 2, there is shown a flow chart describing the coordinated axis movement algorithm, which is the heart of the instant invention. This routine uses a time base, which generates an interrupt on a periodic basis. Advantageously, both the X and Y-axis are slaved to this time base. Accordingly, the time base is considered an imaginary axis acting as the master axis. Utilizing a time base for an imaginary master axis enhances tool position accuracy, as well as providing precise feed rate for both axis.

The time base algorithm shown in FIG. 2 reduces velocity variation by dynamically controlling the X and Y-axis velocity. Also, the algorithm set forth in FIG. 2 provides the means to vary the velocity during a curing operation, thereby allowing the operator to provide a constant cutting rate over the tool, constant surface feet per minute, as well as other functions to give a more accurate and uniform surface.

Referring now to FIG. 2 the algorithm is first initialized beginning in block 30 with a time base interrupt. Block 30A latches the laser data which satisfies the watch dog timer for this time base period which is 32 microseconds. Block 30B sets spindle, sprays, and other machine functions as pre-programmed for this execution of the algorithm. Block 31 institutes an initialization procedure for the processor and co-processor registers. Block 32 sets or clears the status bits as required, and block 33 will modify the interrupt vector to point to the beginning of the main loop of the algorithm which is block 34. Block 33B unlatches the laser data in preparation for the next algorithm cycle. Block 33C waits for the next time interrupt. The next time interrupt begins the process in Block 34.

The first function, as indicated in block 35, is to latch the X and Y-axis laser data and satisfy the watch dog timer. This data indicates the current position of both the X and Y-axis. In block 36, the time interval counter is decremented. The time interval counter is the heart of the system, and indicates the time in which to perform a particular function within the line segments. This information is, of course, placed into the system memory prior to commencement of a particular operation by the preprocessor and is loaded into the time interval counter register by block 52. Also, the time base provided by the time interval counter is, as previously described, acting as the master axis to which the X and Y-axis movements are slaved. Block 37 determines whether any time intervals are remaining in the time interval counter. Initially, there are no intervals remaining causing path 50, 51, 52 to be taken, thus completing the initialization for the next time interrupt. Assuming time intervals are remaining, block 38 will then calculate the new X and Y-axis velocities. This calculation must execute fast and, to this end, the data is precalculated into the form of four 32 bit binary numbers scaled and formatted to the 16 bit DAC input, such that the upper 16 bits of the 32 bit numbers contain raw DAC input data and the lower 16 bits contain fractional DAC increments. Two of the numbers contain the initial X and Y velocities, and the other two numbers contain the delta velocity per time interval for X and Y. Formatting the data in this fashion allows the microprocessor to calculate velocity with a simple add operation, which is extremely fast when compared to a multiply or divide operation. Resolution has not been compromised because the 32 bit number allows the least significant bit of the DAC to be broken down into 65,535 parts. This resolution is necessary because the delta velocity is added to the present velocity, or initially the initial velocity every 32 microseconds, which requires that the delta velocity be a small fraction of a least significant bit if gradual acceleration is to be permitted.

Block 39 accomplishes the function of writing the new X and Y velocity to the X and Y-axis via the velocity DAC converters 12 as shown in FIG. 1.

In block 39A, the present X and Y position are read. The form of the data is in laser fringe counts. One laser fringe count is set to 0.013 micrometers.

In block 40, the X-axis error is calculated. This is accomplished by subtracting the present X position, which is read in block 39A, from the calculated X position, which is the accumulation of the starting position fringe counts, plus the velocity in fringe counts per time interval where the velocity is the accumulation of the starting velocity, plus the delta velocity in fringe counts per time interval. There are two unique features to this calculation: first, by defining a fixed acceleration per line segment, the calculation for present position is reduced from a double integration to a double addition, which calculates extremely fast; and second, the velocity and delta velocity per time interval used in block 38 are also used in block 40, but are precalculated in the units of fringe counts per time interval, and delta fringe counts per time interval and are in the form of double precision floating point numbers which are processed by the math co-processor for higher speed.

In block 41, it is determined whether the X-axis user fast jog control is activated. Assuming that the X-axis fast jog is not activated, then in block 42 the X-axis error is multiplied by 16, which in a binary number is shift left four times. Similarly, if the X-axis fast jog is activated, the algorithm proceeds to block 43, where the X-axis error is applied to the X-axis preamp as shown in FIG. 1. Thereafter, in block 44, the Y-axis error is calculated as the X axis error was calculated in block 40, the Y-axis user fast jog control is checked in block 45. Blocks 46 and 47 function in an identical manner to blocks 42 and 43 described above.

After the Y-axis error is applied to the Y-axis preamp, the laser data is unlatched in block 48 and, thereafter, the program returns to the commencement of the algorithm via block 49 with the next time interrupt.

Returning now to block 37, the algorithm proceeds to block 50 when it is determined that there are no time intervals remaining in the time interval counter, thus completing a line segment. In block 50, the number of line segments are decremented in the line segment counter. Block 51 determines whether any additional line segments exist. If so, new line segment data is loaded into the processor and co-processor at block 52, and, in block 53, new X and Y-axis velocity data is applied to the X and Y-axis velocity DAC. Thereafter, in block 54, the laser data is unlatched and the program returns to entry via 55 with the next time interrupt.

Returning now to block 51, when all line segments have been exhausted, the algorithm proceeds to block 56, wherein the interrupt vector is modified to point to the next routine to be executed. The vector data is stored in memory as indicated in block 57. Laser data is again unlatched (block 56A) in preparation for the next interrupt. The program then returns via block 58, with the next time interrupt to the initialization portion of the next algorithm to be executed.

Figure 3:
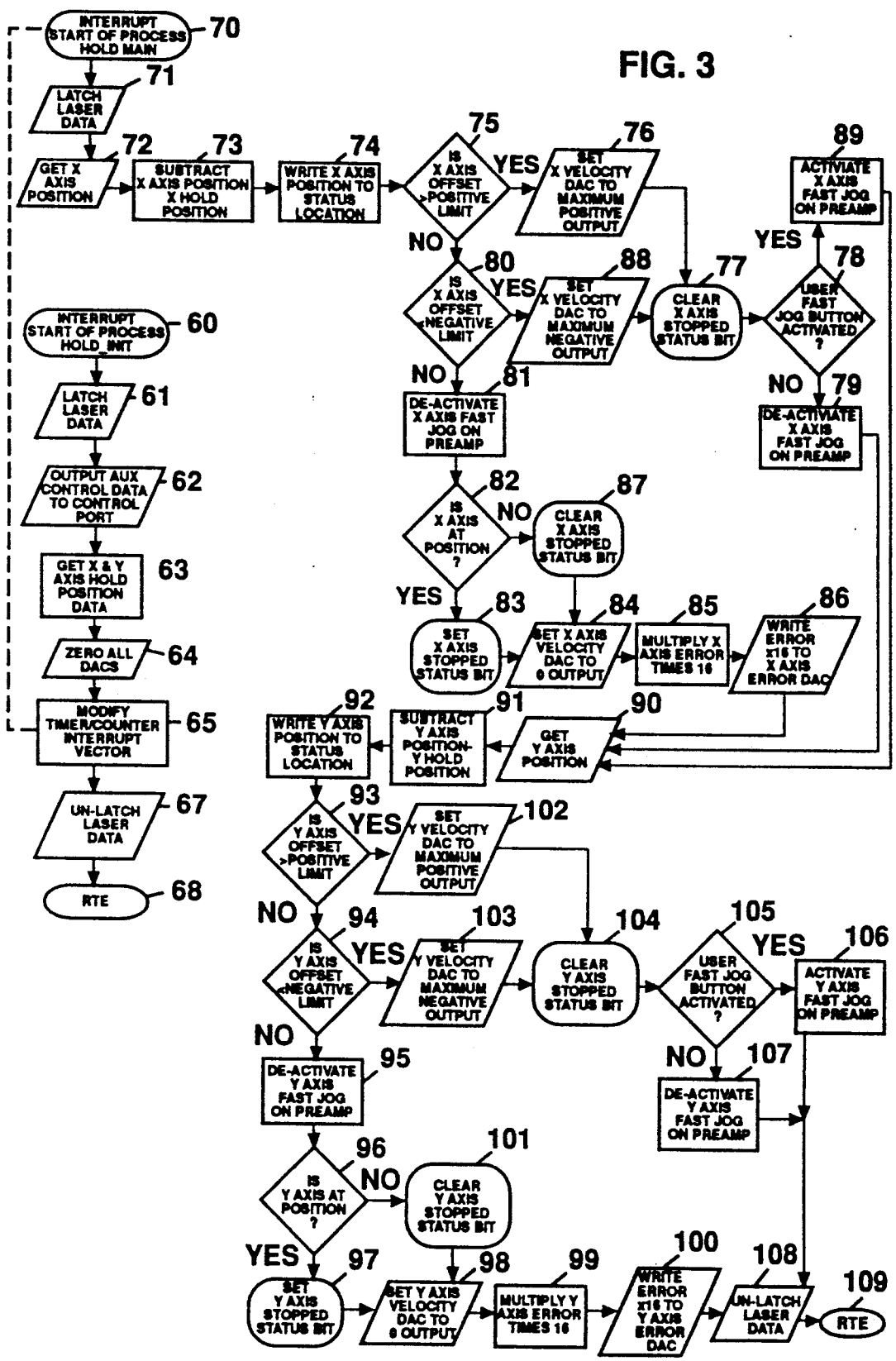
FIG. 3 is the flow chart of the hold position algorithm which additionally controls machine jogging.

Referring now to FIG. 3, there is shown a hold position algorithm for use with the instant invention. This algorithm will move the X and Y-axis to a specified position and then hold the same specified position. Each axis moves independently of the other axis. Therefore, care should be exercised when using this algorithm. If an axis is a great distance from the specified hold position, then that axis will travel at full speed towards the hold position, and slow down using a linear ramp as the holding position is reached. If an axis is already at the designated position, then that axis will be held at that position in accordance with the algorithm.

More particularly, referring to FIG. 3, the algorithm is entered in block 60 via a vector and time interrupt. Block 61 latches the laser data and satisfies the watch dog timer for this time period. Block 62 sets the spindle, sprays, and other machine functions. Block 63 loads the position data into the appropriate registers. Block 64 initializes all DAC's to zero. Block 65 modifies the timer interrupt vector to point to block 70. Block 67 unlatches the laser data in preparation for the next timer interrupt cycle. Block 68 waits for the next time interrupt which will cause execution of block 70, which is the main loop entry point of this algorithm.

Block 71 latches the laser data and satisfies the watch dog timer for this time period. Block 72 reads the X axis position. Block 73 computes the offset. Block 74 writes the position data for display by the system control CPU. Block 75 compares the offset to the positive limit. If it is greater than the limit, then block 76 is executed and the X axis DAC is set to maximum positive output. Block 77 clears the X axis stopped status bit. If the result in block 75 is less than the positive limit, then block 80 compares the offset to the negative limit. If it is less than the negative limit, then block 88 is executed and the X axis DAC is set to maximum negative output and block 77 is executed. Block 78 checks for operator request for fast jog. If yes, then block 89 activates X axis fast jog and proceeds to block 90. If no, then block 79 deactivates fast jog and proceeds to block 90. Returning to block 80, if the result is no, then block 81 deactivates X axis fast jog. Block 82 compares the offset with an "at position" tolerance. If it is within tolerance, then block 83 sets the X axis stopped status bit and, if it is not within tolerance, then block 87 clears the X axis stopped status bit. Either way, block 84 sets the X axis DAC to zero. Block 85 multiplies the offset by 16. Block 86 writes the result to the X axis error DAC and proceeds to block 90.

Blocks 90 through 107 operate on the Y axis as blocks 72 through 89 did on the X axis.

Block 108 unlatches the laser data in preparation for the next algorithm cycle, and block 109 waits for the next time interrupt.

The instant invention has been used for the very precise and accurate production of soft contact lenses, hard contact lenses, reflective optics, aspheric standards, and other research lenses. Production precision and speed achieved with the instant invention far exceeds the precision and speed possible with prior art machine control systems.

Although the invention has been described in terms of particular embodiments, one of ordinary skill in the art can generate additional embodiments and modifications without departing from the spirit or scope of the claimed invention. Accordingly, it is to be understood that the illustrations and descriptions herein are proffered by way, of example, to facilitate comprehension of the invention, and should not be construed to limit the scope of the invention.

I claim:

1. A programmable controller for operating a machine having a controllable X-axis function and a controllable Y-axis function to allow the machine to carry out a plurality of programmable functions, which controller comprises:

a plurality of processor means wherein a first processor means pre-processes incoming data and forwards pre-processed data including velocity and acceleration data present in multiple forms and control information to one or more second processor means which provides control information to control machine movement;

means included within said second processor means for providing a periodic time-based interrupt; and means responsive to said time-based interrupt for controlling said X-axis and said Y-axis functions.

2. A programmable controller in accordance with claim 1, wherein acceleration is controlled by multiple additions.

3. A programmable controller in accordance with claim 1, wherein more than two axis are controlled.

4. A programmable controller in accordance with claim 1, which has more than one machine control processor.

5. A programmable controller in accordance with claim 1, incorporating a watch dog timer circuit.

* * * * *